United States Patent

[11] 3,588,869

[72] Inventor Eugene Emerson Clift
 719 S. Beach St. Apt. 309-B, Daytona Beach, Fla. 32014
[21] Appl. No. 784,429
[22] Filed Dec. 17, 1968
[45] Patented June 28, 1971

[54] AUTOMATIC SCORING SYSTEM
 11 Claims, 7 Drawing Figs.
[52] U.S. Cl. ...................................... 340/323, 325/111
[51] Int. Cl. ...................................... A63k 3/00
[50] Field of Search ........................... 340/323, (Inquired); 325/66, 29, 111, 117

[56] References Cited
UNITED STATES PATENTS

| | | | |
|---|---|---|---|
| 2,229,324 | 1/1941 | Gordon .................. | 340/323X |
| 3,434,712 | 3/1969 | Matsumura et al. ......... | 340/323X |
| 3,508,034 | 4/1970 | Toyama et al. ............ | 340/323X |

Primary Examiner—John W. Caldwell
Assistant Examiner—Michael Slobasky
Attorney—Mason, Fenwick & Lawrence ABSTRACT: An electronic scoring system for scoring vehicles in a plural lap race on a race track including a telemetry transmitter on each vehicle transmitting distinctive signals identifying the vehicle, telemetry receivers for receiving signals from the transmitters when the vehicles are in a selected reception range zone near the finish line, vehicle counters activated by the respective receivers for registering the laps completed by each vehicle, a lead lap counter for registering the identity of the leading vehicle and the laps completed, logic circuitry for storing certain of this registered information, and printers for producing a first printout after each lap of the vehicle number by pole position, the laps completed and elapsed time, and a second printout after every tenth lap of the order of the vehicles.

PATENTED JUN28 1971 3,588,869
SHEET 1 OF 5
Fig-1
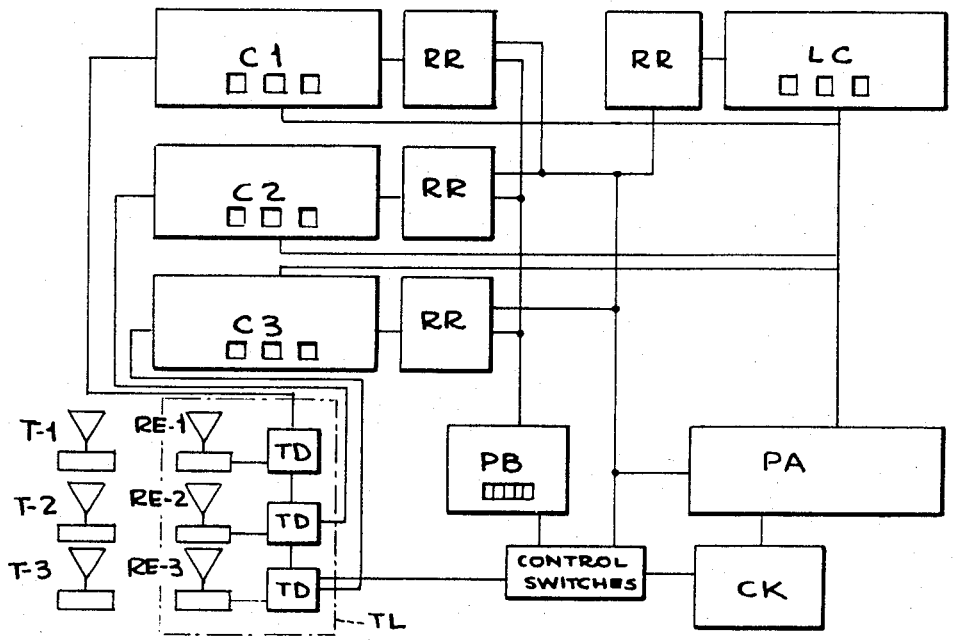
Fig-3
Fig-4
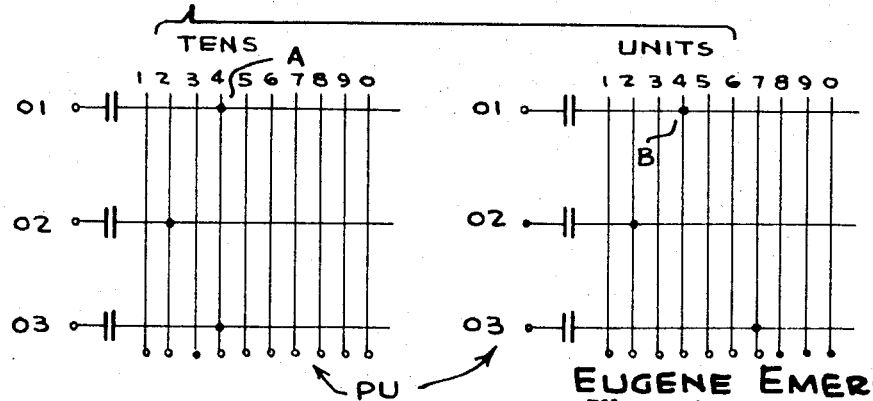
INVENTOR
EUGENE EMERSON CLIFT
BY
Mason, Fenwick & Lawrence
ATTORNEYS

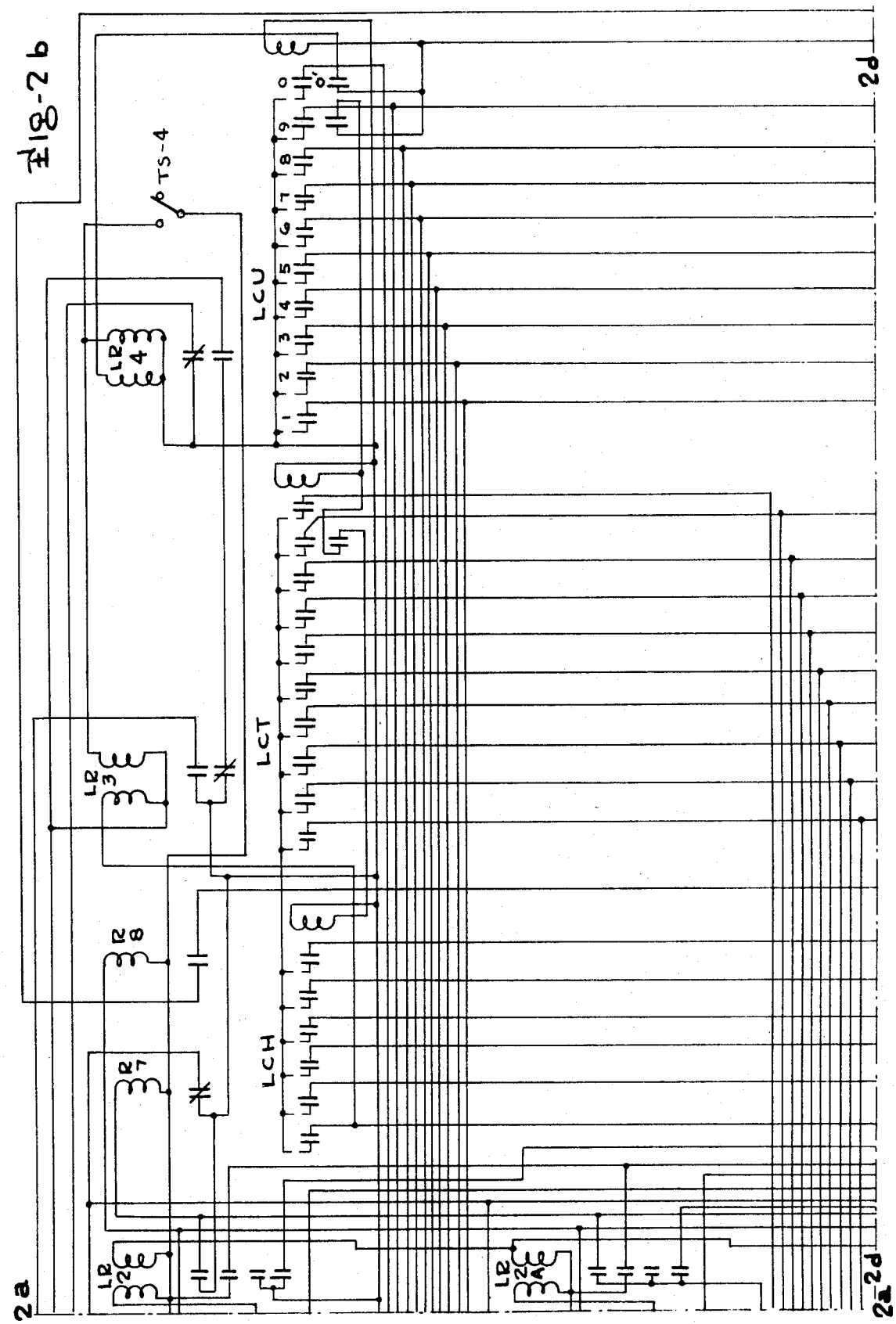

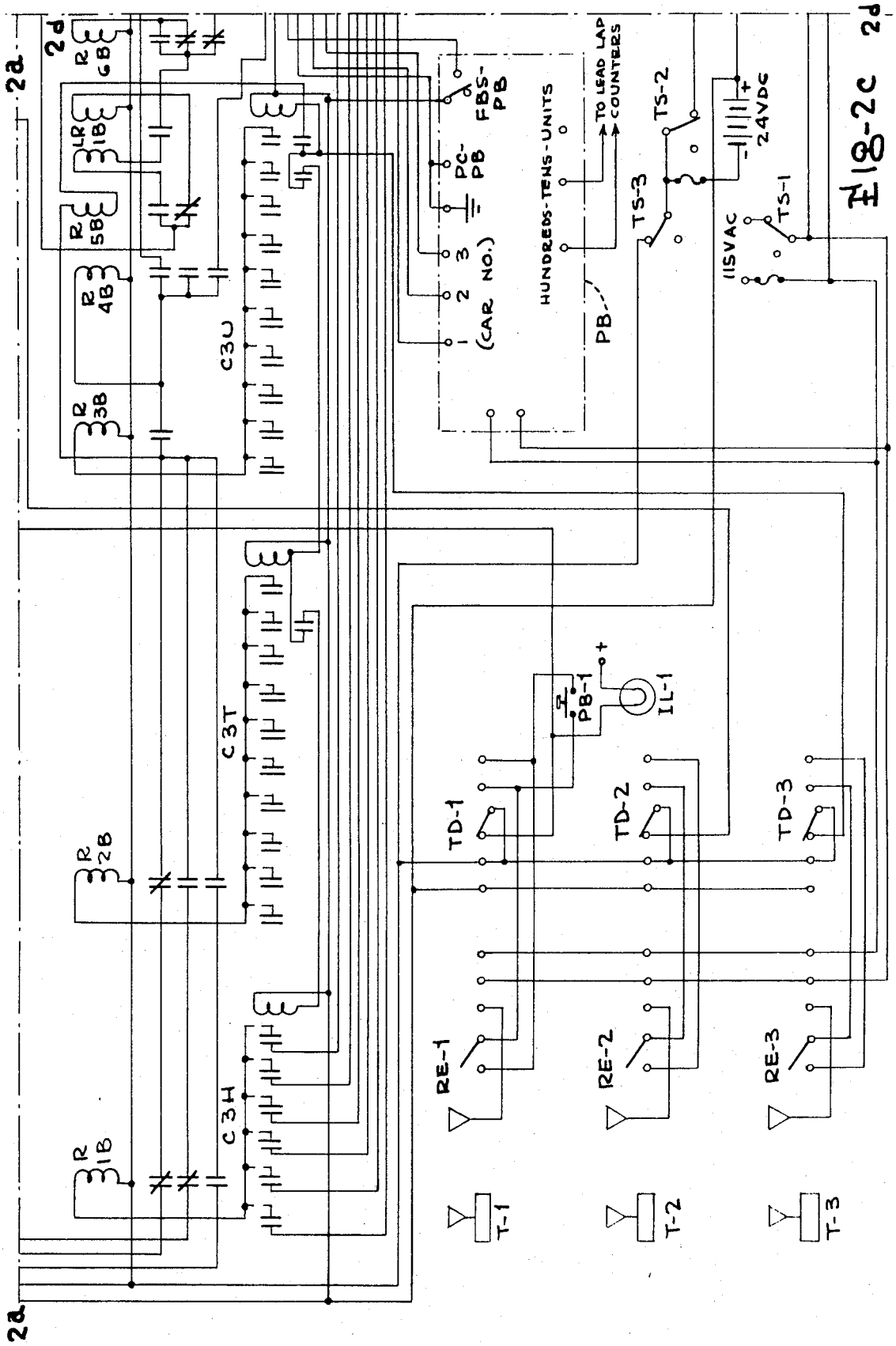

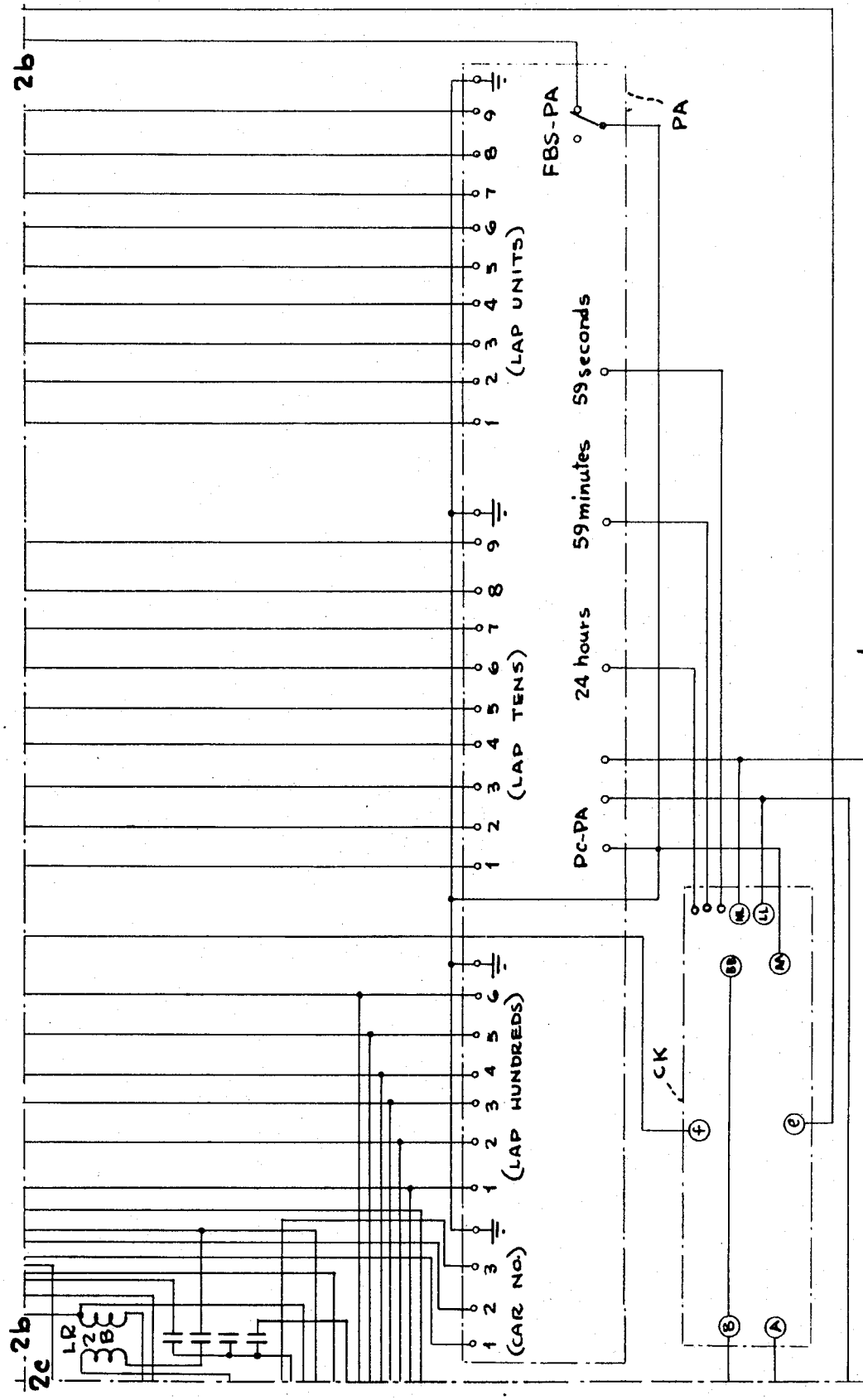

AUTOMATIC SCORING SYSTEM

BACKGROUND AND OBJECTS OF THE INVENTION

The present invention relates in general to electronic raceway scoring systems and particularly to data processing and recording apparatus for electronically recording information items relevant to the scoring of vehicles on a vehicle racetrack and providing instant running information on the race, such as the number of laps completed by each vehicle, the elapsed time, the lap underway, and the vehicle number according to pole position, and providing output information after every 10 laps giving the order of the vehicles in the race relevant to each tenth lap.

Heretofore, it has been difficult to totally eliminate human error involved in manual scoring of vehicle races on race tracks and speedways. Also, it is most difficult for spectators in the stands to have prompt knowledge throughout the race of the relative standings and progress of each of the contestant vehicles.

The present invention provides apparatus for automatically and continuously monitoring the progress of the vehicles in the race by telemetry techniques and counting, storage and logic systems.

It provides for an instant readout of the laps completed by each vehicle in the race and gives the vehicle number according to pole position. In addition, it provides for a printout on a digital printer of the lead vehicle number, the lap it has completed and the elapsed time of the race. The apparatus also includes a digital clock to provide a visual readout of the elapsed time throughout the race. Furthermore, the system produces a printout on a second printer of the actual standings of the vehicle according to positions after every 10 laps giving the proper 10th lap and the number of each vehicle in the order it completes that particular lap. Only vehicles within 10 laps of the lead vehicle will be scored during each 10 lap printout.

A significant advantage of this invention is that it eliminates the human error involved in manual scoring of a race. It also will permit the latest standings of the race being made available to the fans in the stands via closed circuit television as well as to the crews in the pits. Both the visual readout and the printouts will also be available for broadcasts and telecasts away from the track which will improve interest in racing by keeping the fans up to date on the standings throughout the race.

Still another advantage of this invention is that all of the scoring data on each car is retained by decade counters for each vehicle until the system is reset. In addition, the transient data, such as the lead car number at the end of each lap, the lap completed and the elapsed time, is retained as printed record. This information storage capability, of course, is valuable in immediately determining the final standings of a race. However, in the event the race is interrupted, this stored information on the number of laps completed by each vehicle would permit a quick and accurate position determination of the vehicles when they line up for a restart of the race.

This system consists of a telemetry section, a counting and storage section, a logic section, and two digital printers. The telemetry section is composed of commercially available solid state telemetry transmitters and receivers which, in one example, may operate, on 27 megacycles with a range of about 350 feet. Each transmitter is so designed that only its receiver will respond. This section also includes a means of "locking in" on a signal as long as a vehicle remains in the range. The storage section consists of commercially available decade counters, three for each vehicle (units, tens, hundreds), which are advanced by the proper telemetry signal. These decade counters provide both a visual readout at the front of the system's cabinet, and an electrical readout of the count information to both the logic section and to the printers. Similar counters are used by the digital clock which gives hours, minutes and seconds. The logic section is composed of reed relay modules mounted on printed circuit boards. This section performs the necessary logic functions to score the race as previously described. The system also includes the two digital printers which are activated by the previously mentioned circuits and components.

BRIEF DESCRIPTION OF THE FIGURES

FIG. 1 is a block diagram of the electronic raceway scoring system of the present invention;

FIG. 2a to 2d collectively forms a schematic diagram of the electronic scoring system;

FIG. 3 is a schematic diagram of a multiple pushbutton switch control circuit usable in the present invention by which a consensus decision by at least two people may be required as to when a race vehicle crosses the finish line or a check point; and FIG. 4 is a diagrammatic illustration of a programming selector switch which may be incorporated in the system so that the actual identifying number of each vehicle can be programmed into the system prior to use.

DETAILED DESCRIPTION OF A PREFERRED EMBODIMENT

Figure 2A:
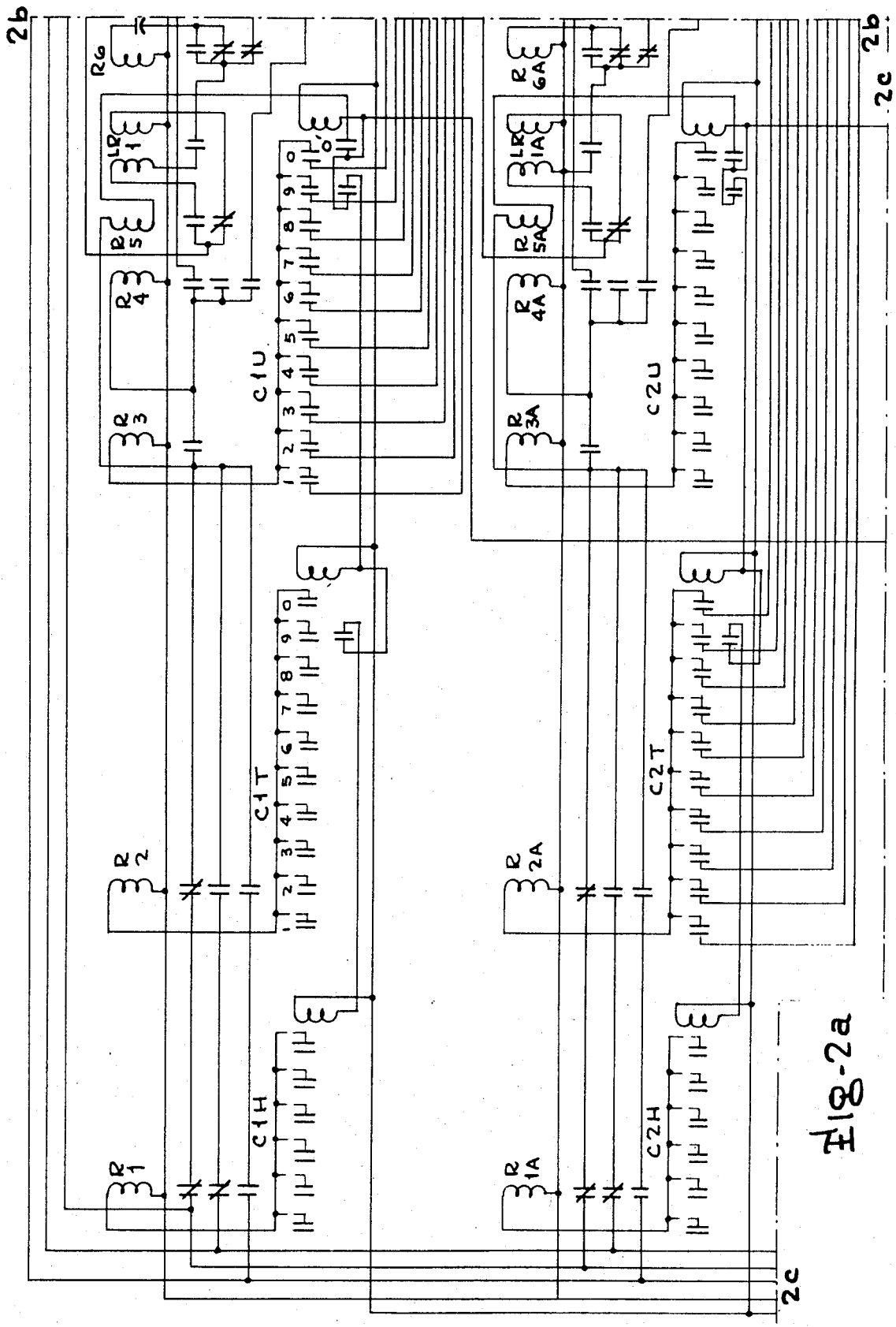

Referring to the drawings, wherein like reference characters designate corresponding parts throughout the several figures, the system of the present invention, as indicated diagrammatically in FIG. 1, includes a telemetry section TL comprising transmitters T-1, T-2, and T-3, on the respective vehicles involved in the race, and associated receivers RE-1, RE-2, and RE-3, respectively, tuned to the frequencies of the transmitters and having associated time delay switches TD-1, TD-2 and TD-3. Two digital printers PA and PB are intercoupled with control switches CS, and are connected with respective vehicle counters C1, C2 and C3 and with a lead lap counter LC, each having reed relay banks, generally designated by the reference character RR associated therewith to provide appropriate control and logic functions, whereby the counters will visually display the desired scoring and vehicle progress information at the front of the cabinet for the system and provide an electrical readout of the recorded information both to the logic relay components and to the printers. Printer PA also is intercoupled with the digital clock CK.

In the use of the system of the present invention, each racing vehicle will be equipped with a solid state telemetry transmitter, three of which are indicated in the drawings by the reference characters T1, T2 and T3, which begin transmitting immediately upon the installation of a battery just prior to placing it in a racing vehicle, and each of which transmits a distinctive signal signifying the identity of the vehicle on certain selected frequencies so that no two transmitters are sending the same signal. The receivers RE-1, RE-2 and RE-3, each have their own antenna, which in one example may be associated in a single bundle of multiple antennae, consisting, for example, of an 8 foot length of number 22 gauge copper wire for each receiver, so located relative to the START-FINISH line that the leading edge of the transmitter signal is received when the vehicle reaches the START-FINISH line. The receiver circuitry for all of the receivers may be connected to their telemetry antenna located at the desired position relative to the START-FINISH line by a shielded cable and housed in a central cabinet which can be located at any desirable location at the track, such as the press box or near the chief scorer's desk. After the race is underway, the signals transmitted from the vehicle transmitters, will be picked up by the multiple antennae bundle and sent to the proper receiver for activation of the counters, the logic circuitry, and the printers as later described in detail.

In the schematic wiring diagram of FIG. 2, the wiring details of the transmitters, the receivers, the time delays TD-1, TD-2 and TD-3, the digital clock CK and the two printers PA and PB are not shown since they are standard commercially available units. However, that portion of their wiring that is required to interconnect with the components of the scoring system is illustrated. Referring more particularly to FIG. 2, the control switches CS for the system include toggle switch TS-1, which provides the 115 XC required to operate the conventional time pulse generator of the digital clock CK and the motors of printers PA and PB. TS-2 is the switch that starts the clock CK at the beginning of the race by providing 24 volts DC to its counters. Switch TS-3 turns on the telemetry receivers RE-1 to RE-3 of the telemetry section TL and provides 24 volts DC to the rest of the scoring system. Switch TS-3 is turned on only after all vehicles have cleared radio range following a start. Switch TS-4 resets the logic after completion of the race or before the start of a new race. Although indicated as toggle switches in the schematic, key type ignition switches can be used in the system to prevent accidental or deliberate tampering with the system during a race or until the race has been declared official.

Following closure of the switches TS-1 through TS-3, the receipt of an appropriate tone signal by any of the receivers RE-1 to RE-3 causes a contact closure within the receiver that sends a pulse to the time delay unit TD-1, TD-2 or TD-3, linked to the receiver. Each of the time delay units is preferably conventional solid state, commercially available type, which starts its timing cycle when the triggering pulse is terminated, and is so constructed that its timing cycle is automatically reset if an additional or stray pulse is received before it times out. This capability causes the receiver and associated time delay to "lock on" to a transmitter signal when it comes within range to insure that a vehicle can only be counted once while within signal range. That is to say, the time delay device is such that, if an additional or stray pulse is received during the timing cycle initiated by an earlier pulse, the later pulse restarts the timing cycle without shifting the contact, and the vehicle counter C1, C2, or C3 associated with the time delay, is advanced by an off pulse or a break in the contact closure, so that only one off pulse occurs as a result of the vehicle being in range. Thus, any vehicle making a pit stop or even in a fringe area, is "locked in" and can only be counted once. Without this feature, it was found that fringe signals could be received as far apart as 5 seconds, causing faulty scoring on the counters. As a further safeguard, the time delay can be adjusted to timing cycles of 30, 40, or 50 seconds, depending on the length of the race course and the maximum lap time, which settings will easily take the vehicle out of range before the time delay can cycle out and a stray pulse advance the associated vehicle counter improperly.

In the schematic diagram of FIG. 2, the vehicle counters C1 to C3 are indicated as each composed of a units counter, a tens counter, and a hundreds counter, designated, for example, C1U, C1T and C1H, and the lead lap counter LC is also composed of units, tens and hundreds counters indicated respectively as LCU, LCT and LCH.

The lead lap units counter LCU is set on the No. 1 contact position at the start of the race since this is the lap underway. A 24 volt DC positive current is sent through the wiper arm and the No. 1 contact position of counter LCU to the No. 1 contact position of all vehicle units counters C1U, C2U, C3U in the system. Counters for only three vehicles are shown in the schematic to simplify the explanation of this system, with the wiring from contacts of the lead lap units counter LCU going only to the contacts of vehicle units counter C1U are shown to further simplify the schematic. It should be obvious that the first vehicle to advance its units counter C1U, C2U or C3U from zero to its No. 1 contact position would be the lead vehicle and could send the proper pulse to trigger a printout on printer PA giving the vehicle number, lap completed and elapsed time. After the printout a signal is sent from the printer PA through its feedback switch FBS-PA to the coil of the units counter LCU which immediately advances it to its No. 2 contact position. Thus, only the lead car can obtain a printout on printer PA. It also should be apparent that it doesn't matter which vehicle is the first to complete lap one or subsequent lead laps.

This invention employs the second printout means by using printer PB to print the standings of all the vehicles within 10 laps of the lead car after every 10th lap. An isolated zero contact 0' on each of the vehicle units counters C1U, C2U and C3U is used to trigger this printout. Storage relays, as will be later explained, store counting information during the printing period so that the scoring of a vehicle won't be missed during a printout.

The three decade counters comprising units, tens, and hundreds counters, such as counters C1U, C1T and C1H, assigned to each vehicle in the race, will count up to 999 laps which is more than sufficient to handle a 24 hour sports car event. These decade counters are wired in a cascade type circuit. It can be observed that the No. 9 auxiliary contact of each of the units counters C1U, C2U and C3U is used to send a pulse to the coil of the associated tens counter C1T, C2T and C3T. As previously stated, these counters advance on the off pulse and as a result the tens counter C1T would not advance until the associated unit counter C1U steps off its No. 9 contact position by advancing to 0—10th position. The No. 9 auxiliary contact of each tens counter C1T, C2T and C3T is used in a like manner to send the proper signal to the hundreds counters C1H, C2H and C3H. The counters C1, C2 and C3 are assigned according to pole position and are so numbered as are the transmitters that are placed in each vehicle. The proper receiver-delay units TD-1, Td-2 and TD-3 are linked to the coil of their respective vehicle units counters C1U, C2U and C3U which can be easily traced on the schematic.

Directly above the vehicle counter C1U, C1T and C1H, as illustrated in FIG. 2, are reed relays R-1, R-2 and R-3. The coil of relay R-3 will be pulled in through the wiper arm of the vehicle units counter C1U anytime it advances to a contact energized by current sent through the wiper arm of the lead lap units counter LCU through one of its 10 contacts, depending only on the position of its wiper arm. Reed relays R-3 are similarly connected to the wiper arm counters C1T and C1H. Reed relays R1A to R3A and R1B to R3B are connected in like manner to the wiper arms of their associated hundreds, tens and units counters of vehicle counters C2 and C3. As stated previously, any of the units counters C1U, C2U and C3U may be the first to advance from 0 to the "hot" 1 contact of its units counter. However, the lead lap counter LCU is immediately advanced to its No. 2 contact position following a single printout which results in only the lead vehicle being scored on printer PA.

Above the lead lap counters LCU and LCT are latching reed relays LR-3 and LR-4. It can be observed that the normal "off" position of latch relay LR-4 will send 24 volts DC through its top closed contact position to the top closed contacts of R-1, R-1A and R-1B. It also can be observed that the same current is being sent through the top closed contact of R-1 and the top closed contact of R-2, to the top open input side of the contact of R-3. Similar circuits can be traced to R-3A and R-3B. This results in only the leading vehicle being able to satisfy the first two conditions for a printout, namely, (1) to be the first to advance any of the unit counters C1U, C2U, C3U to a "hot" contact, and (2) to have current to the open contact of the relay it pulled in through a circuit from its wiper arm to the relay coil. It also can be observed that when the lead lap counter LCU reaches its zero (10th) position, an isolated zero 0' will then send a negative pulse to the latch coil of IR-4, which opens its top closed contact and closes the open bottom contact. This sets up a "hot" circuit from the bottom contact LR-4 to the second closed contact of R-1, R-1A and R-1B. A current is now sent from the second closed contact of R-1 to the second open contact of R-2 and to the open contact of R-3 if R-2 has been pulled in.

It should be evident now that for a vehicle to obtain a lead car printout, it must satisfy a third condition; namely, (3) be the first vehicle to reach the No. 1 contact position of the tens counter C1T, C2T or C3T, or as may be the case, satisfy the conditions of both the tens and units counters. This also releases the units counters C1U, C2U or C3U of any vehicle in a trailing position from having current to its units relay contacts. It also should be noted that the lower or second contact of LR-4 obtains current through a closed contact of LR-3. When the hundreds lead lap counter LCH reaches the No. 1 contact position, indicating completion of 100 laps, it will pull in the latch coil of LR-3 which will close the top open contact and open the previously closed bottom contact. This sets up the new "hot" circuit which leads to the third open contact of R-1, R-1A and R-1B. This also sets up a fourth condition to obtain a printout; namely, (4) the lead car must be in the proper hundreds lap and in addition must be in identical tens and units laps of the lead lap counters LC in order to obtain a printout.

To obtain a lead lap printout, additional switching actions occur; if R-3 is pulled in through the units counter C1U and all the above conditions necessary for a lead lap are met, the closing of the open contact of relay R-3 will pull in the coil of relay R-4, which will close its three open contacts. The top contact of R-4 will then pull in the coil of relay R-8, closing this contact which activates a readout command in the digital clock CK through its $e$ and $f$ connector contacts. A 24 volt DC negative print command PC-PA is then sent to printer PA and negative also is supplied as a common to the print selector solenoids incorporated in the printer PA. The positive current already is being supplied by circuits shown in the schematic with one or more of the lead lap decade counters LC through the numbered connector contact. The lead lap hundreds counter LCH only shows six contacts since that will handle a 24 hour race, but it actually is a decade counter. The clock printout information in the form of positive current also had been supplied, and awaits this negative current to operate proper print selector solenoids. A positive pulse also has been sent through the lower contact of R-4 to the proper vehicle identification number solenoid of the printer and it, too, is activated by the negative power supply provided by the clock switch closure. The extra contact on R-4 is used when a two digit number is required to identify a vehicle. A feedback switch FBS-PA in printer PA also accepts the negative pulse and transfers it through the closed contact to the coil of the lead lap units counter LCU. When the printout has been completed, the feedback switch FBS-PA opens momentarily, breaking the negative current to the coil of the lead lap counter LCU which, as stated before, advances or "counts" on the off pulse. This in turn sets up a new lead lap or lap underway condition and the power is removed from No. 1 contact of vehicle counter C1U, C2U and C3U which drops out R-3, R-4 and R-8 and returns both the clock CK and printer PA to their ready positions to accept the next print command.

Printer PB provides a printout of all vehicles within 10 laps of the lead vehicle every 10 laps. In addition, it will print the proper lap being counted, such as 10, 20, 30, etc. This lap count is obtained by printer PB solenoids by connections to the lead lap tens and hundreds counters LCT and LCU only. The printer PB prints the unit "0" automatically unless given another command. These lap connections are not shown but would duplicate the DC positive current connections of the tens and hundreds counters LCT and LCH to the numbered contacts, as shown for printer PA.

To start the 10 lap printout cycle the first condition to be met is that the lead lap must be advanced 10 laps which provides the positive current to one side of the coil of relay R-5. The negative will be supplied by the isolated zero contact 0' of the units counters C1U, C2U and C3U activated by the signals from the transmitters of the various vehicles. These will be activated in the order each vehicle completes 10 laps. Only those vehicles completing 10 laps before the lead car advances 10 laps can be counted during any 10 lap period, since both R-1 and R-2 conditions dictated by the lead lap tens and hundreds counter LCT and LCH must be satisfied in addition to a zero condition of the various vehicle units counters C1U, C2U and C3U. The open contact of relay R-5 then pulls in the latch coil of relay LR-1 providing that no printer PB print command is in its print cycle. In such event the power to the contacts of relay R-5 has been removed by relay R-7 being activated by a prior print command. This circuitry enables the storage of a printout command until the earlier printout is completed. If two print commands are received at the same time, the first one in the series circuit would be favored. Continuing with the command circuitry of printer PB, when relay LR-1 pulls in it provides power through its contact to the contacts of relay R-6. Power is sent through the third closed contact of relay R-6 to the latch coil of relay LR-2, and through its second closed contact to its own coil. A capacitor is included in this circuit for the purpose of providing a slight delay to insure that the coil of LR-2 has been pulled in and for a more positive make-before-break action of the R-6 coil, which is then held in by the top open contact of relay R-6 until the triggering relay, R-5, drops out. The purpose of relay R-6 is to permit only one signal being sent to latch relay LR-2 during the about 50-second period the units counter C1U remains at the zero position before the vehicle can make another lap. Once relay LR-2 is pulled in, it sends a pulse through its top contact to pull in relay R-7, which as stated previously, prevents any other attempt for printer PB printout until the present printout is completed. The second contact of LR-2 sends a negative print command pulse PC-PB to printer PB. The bottom contact of LR-2 sends the positive pulse to the proper digital selector solenoid in printer PB. As in printer PA, the negative print command pulse also is used as the common for the digital selector solenoids of printer PB. A positive print complete pulse FBS-PB will be sent back by printer PB to the reset coil of relay LR-2, which can be received since the set pulse was of momentary duration. This terminates the print command cycle and drops out relay R-7, so that any print command held in storage can now obtain a printout. Reed relay R-7 is in a common circuit with all the print command circuits of printer PB, one for each set of vehicle decades in the system.

As previously mentioned, the logic circuit formed of relays R-1 to R-8 and latch relays LR-1 to LR-4 is reset through momentary closure of switch TS-4. The decade counters used to control and count laps can be reset in a well-known manner by the wiring diagram provided by the manufacture of the counters. The digital clock CK is reset by necessary controls installed by the manufacturer on the front of the clock panel.

With this system as visual readout of the laps completed by each vehicle in the race, the elapsed time and the laps underway, representing a running score of the event is instantly available for the broadcast and telecast, or closed circuit TV to the spectators in the stands, by monitoring the counter indicators and digital clock indicators on the front of the cabinet in which this system is housed, and the printers provide a printout of the lead vehicle number and laps completed and elapsed time as well as a printout of the order of completion of each successive tenth lap by the vehicles.

Referring now to FIG. 3, there is illustrated a multiple pushbutton switch control circuit which may be incorporated in the system to provide a sophisticated, foolproof, method for manually encoding the laps completed by each vehicle whereby one or more official scorers, one for each pushbutton, must reach a consensus verdict as to the exact moment the vehicle being scored crosses the START-FINISH line or crosses a checkpoint for an additional lap count.

Referring to FIG. 3, showing this multiple pushbutton circuit associated with time delay unit TD-1, it will be observed that the two pushbuttons PB-1 and PB-2 are connected together in series circuit relation across the same trigger switch contacts of time delay unit TD-1 which activate the latter upon contact closure in the associated receiver RE-1. The signal contacts of the time delay unit TD-1 are connected, as shown, to the coil of associated units counter C1U and to the indicator lamp IL-1, whereby activation of TD-1 drops out power to the lamp IL-10 and immediately advances the units counter C1U 1 step. Pushbuttons PB-1 and PB-2 are wired in series so that both must be activated to energize the time delay relay TD-1, which duplicates the contact closure action in the radio receiver unit RE-1. Thus, either receiver contact closure, or simultaneous closure of the two pushbuttons will activate the time delay unit TD-1 to start its timing cycle, depending on which occurred first. The timing cycle begins when trigger circuit is released, but will recycle if trigger circuit is again closed before reset time cycle is completed, as for example, by a fringe telemetry signal.

This pushbutton circuit is employed with the scoring system in such a way that the scorers are alerted prior to the vehicle reaching the checkpoint. For example, assume that a vehicle traveling at top speed could complete a lap on a particular track in 50 seconds, and that the time delay TD-1 is set for a 30-second delay cycle. Upon activation of the time delay unit TD-1 to start timing out its timing cycle by the closure of the contacts of the receiver RE-1 as a result of a signal transmitted by the transmitter of the associated vehicle, the power is withdrawn from the pushbutton switches PB-1 and PB-2 and from indicator light IL-1, as well as from the coil of the associated decade counter C1U which is immediately advanced by the "off" pulse. Assuming that the transmitter in the vehicle remains in signal range for 10 seconds, this added to the 30-second delay that starts from the moment that the last signal is received will result in the power being restored to the indicator light and the associated counter only after 40 seconds have elapsed. During this period, no additional counts can be made by either the pushbuttons, telemetry, or any other means. The indicator light will come back on about 10 seconds before the vehicle is due to pass the checkpoint, thus again alerting the scorers.

It should be obvious that manual encoding could be provided by a single pushbutton PB-1, as shown in FIG. 2c, which would require only one scorer for each vehicle. This would be desirable when the pushbutton encoders are used as a BACKUP for the telemetry system. The previously described double pushbutton encoding system is designed primarily for races where radio transmitters and receivers are not used although it should be obvious that they also could function as a backup for the telemetry system. The backup provision would be necessary in event a telemetry transmitter went out of action as the result of a collision that wasn't severe enough to keep the vehicle from continuing in the race. As previously described, only one count can be obtained during a lap whether it is the result of activating the pushbutton encoder or the result of the radio receiver sending the signal to trigger the time delay in that particular circuit, thus removing the DC negative current from the units counter coil for the preset delay period. When the full cycle of the time delay is completed, it restores the power to the associated indicator lamp and "cocks" the associated decade counter which will advance on the off pulse the next time the time delay is triggered by either the pushbutton or telemetry means.

FIG. 4 illustrates diagrammatically programming selector switches which may be incorporated in the system, if desired, so that the actual number of each vehicle may be programmed into the system prior to the race. This would result in the printout on both printer PA and printer PB of the correct number of the vehicle instead of the number according to pole position. This is achieved by assigning the encoding units according to pole position as previously described, but channeling the circuits through the programming selector switches before connections are made to the printers. For example, assume that a proper encoding pulse has been sent by vehicle 01, designating the lead pole position, and that the actual number of the vehicle is 44, and assuming that this vehicle has just registered a lead lap for a printout on printer PA. By channeling circuits from the two bottom contacts of relay R-4 (see FIG. 2a) to the units and tens 01 contacts, respectively of the programmer units PU shown in FIG. 4, the number 44 would be printed out by printer PA assuming that the slide switches of the two programmer units are set to connect the vertical and horizontal conductors at the crossing points A and B shown in FIG. 4 and that the lower terminals of the vertical conductors are connected to the proper circuits of the printer PA.

Contacts of programmer units as illustrated in FIG. 4, also provide circuits for printer PB. Assuming the vehicle 01 provided a proper lap encoding pulse for a 10 lap standings printout, the bottom two contacts of latch relay LR-2 would, when closed, send proper pulses to the units and tens 01 programmer circuits which will also be set as indicated in FIG. 4, to result in the number 44 being printed out on the printer B.

I claim:

1. An electronic vehicle race scoring system for registering scoring information including the number of completed laps regarding each of the vehicles engaged in a race of plural laps on a race track, comprising means for continuously maintaining throughout the race a count of the number of laps completed by each vehicle including a plurality of first counters each assigned to a respective one of said vehicles, telemetry transmitter means in each vehicle for transmitting distinctive identifying signals for each vehicle, telemetry receiver means for each vehicle having a selected reception range restricting reception of transmitted signals from its associated vehicle transmitter means to vehicle locations in only a selected portion of a lap and stationed to receive signals from said transmitters when the respective associated vehicle reaches a location along the race track signifying completion of a lap and apply an activation signal to the first counter associated therewith, means activated by said first counters for continuously producing an output indication of the laps completed by each vehicle throughout the race, second counters actuated responsive to said first counters for recording the number of laps completed by the leading vehicle and the identifying number thereof, and printer means intercoupled with said counters for producing a printout after every tenth lap designating the number of the lap and the identifying number of each vehicle in the order they completed that lap.

2. An electronic vehicle race scoring system as defined in claim 1, including first logic circuit means coupled with said second counters for determining which vehicle is to be credited with scoring a lead lap, and second logic circuit means coupled with said counters for conditioning said printer means to score the standings of each vehicle after every 10 laps.

3. An electronic vehicle race scoring system for registering scoring information including the number of completed laps regarding each of the vehicles engaged in a race of plural laps on a race track, comprising means for continuously maintaining throughout the race a count of the number of laps completed by each vehicle including a plurality of first counters each assigned to a respective one of said vehicles, telemetry transmitter means in each vehicle for transmitting distinctive identifying signals for each vehicle, telemetry receiver means for each vehicle having a selected reception range restricting reception of transmitted signals from its associated vehicle transmitter means to vehicle locations in only a selected portion of a lap and stationed to receive signals from said transmitters when the respective associated vehicle reaches a location along the race track signifying completion of a lap and apply an activation signal to the first counter associated therewith, means activated by said first counters for continuously producing an output indication of the laps completed by each vehicle throughout the race, and a multiple pushbutton circuit for each vehicle entered in the race having a pair of pushbuttons to be manually concurrently actuated by two separate scoring officials when the associated vehicle reaches a selected position along the track, said pushbuttons circuit being connected to the first counter for the associated vehicle to activate said counter to score a lap only upon concurrent actuation of said pushbuttons.

4. An electronic vehicle race scoring system for registering scoring information regarding each of the vehicles engaged in a race of plural laps on a race track, comprising a plurality of first counters each assigned to a respective one of said vehicles, telemetry transmitter means in each vehicle for transmitting distinctive identifying signals for each vehicle, telemetry receiver means for each vehicle having a selected reception range restricting reception of transmitted signals from its associated vehicle transmitter means to vehicle locations in only a selected portion of a lap and stationed to receive signals from said transmitters when the respective associated vehicle reaches a lap-designating location along the race track and apply an activation signal to the first counter associated therewith, and means activated by said first counters for continuously producing an output indication of the laps completed by each vehicle throughout the race, each of said telemetry receiver means including the time delay means for immediately activating the associated first counter to register completion of a lap and concurrently initiating timing out of a selected delay cycle responsive to reception of transmitted signals from its associated said time delay means preventing another activation of the associated first counter until after timing out of a selected time delay cycle by said time delay means adequate for departure of the associated vehicle from the normal reception range of the receiver means.

5. An electronic vehicle race scoring system as defined in claim 4, including first printer means for producing an immediate and automatic printout after each lap of a number identifying the lead vehicle and the lap completed.

6. An electronic vehicle race scoring system as defined in claim 4, including clock means for timing the elapsed time from the start of the race, and means coupling said clock means with said first printer means for including in said printout a record of the elapsed time of the race for each lap printout.

7. An electronic vehicle race scoring system as defined in claim 4, including second printer means for producing a printout after every 10th lap designating the number of the lap and the identifying number of each vehicle in the order they complete that lap.

8. An electronic vehicle race scoring system as defined in claim 4, including a multiple pushbutton circuit for each vehicle entered in the race having a pair of pushbuttons to be manually concurrently actuated by two separate scoring officials when the associated vehicle reaches a selected position along the track, said pushbutton circuit being connected to the time delay means for the associated vehicle to activate said first counter to score a lap only upon concurrent actuation of said pushbuttons.

9. An electronic vehicle race scoring system as defined in claim 8, including an alerting lamp, and means connecting said alerting lamp with said time delay means for energizing said lamp upon completion of said time delay cycle.

10. An electronic vehicle race scoring system as defined in claim 4, including a single pushbutton backup circuit for each vehicle entered in the race to be manually operated by scoring officials when the associated vehicle reaches a selected position along the track, said pushbutton circuit being connected to said time delay means for the associated vehicle for activating said first counter to score a lap immediately upon activation of the said time delay means by either a triggering pulse from the single pushbutton or said telemetry receiver means.

11. An electronic vehicle race scoring system as defined in claim 9, including a single pushbutton backup circuit for each vehicle entered in the race to be manually operated by scoring officials when the associated vehicle reaches a selected position along the track, said pushbutton circuit being connected to said time delay means for the associated vehicle for activating said first counter to score a lap immediately upon activation of the said time delay means by either a triggering pulse from the single pushbutton or said telemetry receiver means.